United States Patent [19]

Murray et al.

[11] 3,942,994

[45] Mar. 9, 1976

[54] EARLY STRENGTH CEMENTS

[75] Inventors: Ransom James Murray, Gravesend; Arthur William Brown, London, both of England

[73] Assignee: The Associated Portland Cement Manufacturers Limited, London, England

[22] Filed: Sept. 23, 1974

[21] Appl. No.: 508,663

[30] Foreign Application Priority Data

Oct. 2, 1973 United Kingdom .............. 45972/73

[52] U.S. Cl. .................. 106/89; 106/100; 106/104

[51] Int. Cl.² ........................ C04B 7/02; C04B 7/35

[58] Field of Search ...................... 106/89, 100, 104

[56] References Cited

UNITED STATES PATENTS

| | | | |
|---|---|---|---|
| 3,140,956 | 7/1964 | Kamlet et al. | 106/89 |
| 3,874,885 | 4/1975 | Lyass | 106/89 |

*Primary Examiner*—J. Poer

*Attorney, Agent, or Firm*—Baldwin, Wight & Brown

[57] ABSTRACT

An early strength hydraulic cement comprising: from 15 to 90 per cent by weight based on the cement, of an orthorhombic or tetragonal phase $XC_{14}A_5$ which is $NC_{14}A_5$ as herein defined or the corresponding phase in which the place of the sodium oxide is at least partly taken by at least one other alkali metal oxide; the balance being predominantly calcium silicates.

8 Claims, No Drawings

EARLY STRENGTH CEMENTS

This invention relates to early strength cements, that is to say cements which after mixing with water rapidly set and harden in a controllable way to yield appreciable early strengths.

It is known that conventional Portland cements after mixing with water, although ultimately yielding high strengths, are initially slow to set in comparison with some other cementitious materials and that the early strength and rate of strength development during this setting period is poor. In some applications, such as where movement of shuttering or the turnover of moulds in a short time is essential or where early exposure to mechanical stresses is required such as in the patching of roads or airport runways, the availability of a cement with many of the properties of a Portland cement but with a rapid and controlled set would be a distinct advantage. Although the rate of setting and strength development of Portland cement can be increased by addition of a monocalcium aluminate (CA) cement and/or accelerators and can be marginally improved by increasing its $C_3A$ content, it is difficult to obtain consistent and reproducible results by these methods, particularly where the process involves pumping a slurry of the cement or a concrete containing it or when used in conjunction with an aggregate contaminated with or containing substances capable of acting as accelerators or retarders of the set of ordinary Portland cements.

Cements containing $C_{12}A_7$ which provide rapid but reproducible and controllable setting times can be produced for such applications as described in our British patent application No. 38202/72. These compositions, however, require the use of a high aluminous material such as bauxite in their raw feed preparation, which increases their cost. Moreover, it is generally necessary to intergrind two separately prepared clinkers to obtain the desired phase composition and physical properties.

The object of this invention is the provision of cements of comparable, and in some instances improved, properties to those of British patent application No. 38202/72, but which do not necessitate the use of expensive raw materials such as bauxite, and which in certain instances can be prepared from a single clinker.

It is known that small amounts of potassium or sodium oxide and other compounds which are present as trace impurities in Portland cement compositions enter into solid solutions in certain of the clinker phases during burning and may affect the hydraulic properties of these phases. It has also been reported during investigations of the $CaO — Al_2O_3 — Na_2O$ ternary system that if additions of $Na_2O$ exceed the solid solution limit of $Na_2O$ in the cubic $C_3A$ phase then it leads to the formation of an ortho-rhombic or possibly tetragonal sodium calcium aluminate phase (or phases). (Y. Suzukawa, Zement-Kalk-Gips, 1956, 9, 345; A. E. Moore, Nature, 1963, 199, 480; J. A. Conwicke and D. E. Day, J. Am. Cer. Soc. 1964, 47, 654; and K. E. Fletcher et al, Mag. Conc. Res. 1965, 17, 171; M. Regourd, Brit. Cer. Soc. Conf. Aberdeen 1973).

Although the exact composition of this compound is disputed in the literature, it is now generally accepted that the initially proposed ternary compound $NC_8A_3$ (where N. represents $Na_2O$, C represents CaO and A represents $Al_2O_3$) is incorrect and that the quantity of $Na_2O$ required to substitute in place of CaO in the cubic $C_3A$ structure in order to form the ortho-rhombic form is of the order of 4.5 per cent. This corresponds to a compound with the formula $(C_{1-x}N_x)_3A$ where $x$ lies between 0.06 and 0.07 which approximates to $NC_{14}A_5$. This nomenclature $NC_{14}A_5$ will for convenience be used throughout this specification to refer to the ortho-rhombic and/or tetragonal sodium calcium aluminate phase (or phases) referred to above, but it should be understood that the use of this nomenclature is not to be understood as limiting the invention to a phase or phases of the composition $NC_{14}A_5$ should further investigation point to an alternative composition for the phase or phases concerned. The $NC_{14}A_5$ may contain $Na_2O$ or traces of other oxides in solid solution.

For the purpose of identification of the phase concerned, it has been found and reported elsewhere that the cubic $C_3A$ phase will take up $Na_2O$ in solid solution to the extent of about 2 per cent by weight. The presence of greater amounts of $Na_2O$ results in the conversion of $C_3A$ into $NC_{14}A_5$, this conversion being complete when the $Na_2O$ content reaches about 4.5 per cent by weight. A further increase in $Na_2O$ content results in a solid solution of $Na_2O$ in $NC_{14}A_5$ until, when the $Na_2O$ content reaches about 6 per cent by weight, yet a further phase forms resulting in a decrease of the $NC_{14}A_5$ content. Phases containing more than 2 per cent or less than 10 per cent by weight of $Na_2O$ contain sufficient $NC_{14}A_5$ to be useful in cements in accordance with the present invention. It should be noted that when the solid solution limit of $Na_2O$ in $NC_{14}A_5$ is exceeded an additional alumina molecule is required for each additional $Na_2O$ molecule, to maintain saturated solid solution, forming an alkali modified calcium aluminate increasingly richer in alumina or a solid solution of sodium aluminate. Some $Na_2O$ also enters into solid solution in the $C_2S$ phase and these two chemical substitutions together eventually preclude the simultaneous formation of $C_3S$.

Reported hydration studies (V. P. Ryagin, Tsement No. 11, 1972, 20–21) of $NC_{14}A_5$ or its solid solutions suggested that it has less hydraulic activity than pure $C_3A$ alone. However, we have found that by utilising $NC_{14}A_5$ or related compounds in which the sodium is mainly or partially replaced by other alkali metals, to provide a substantial proportion of the hydraulic constituents of an otherwise primarily siliceous cement, together if necessary with retarders and/or accelerators selected and proportioned to provide a desired delay in setting to enable working and placing, it is possible to obtain a rapidly setting and hardening cement giving early strength but at the same time having a setting time which is controllable even in the presence of contaminants which are known to have a retarding effect upon conventional Portland cement.

According to the invention we provide an early strength hydraulic cement comprising: from 15 to 90 per cent by weight based on the cement, of an ortho-rhombic or tetragonal phase $XC_{14}A_5$ which is $NC_{14}A_5$ as herein defined or the corresponding phase in which the place of the sodium oxide is at least partly taken by at least one other alkali metal oxide; the balance being predominantly calcium silicates. The $XC_{14}A_5$ may contain $Na_2O$ or other alkali metal oxide, or traces of other oxides, in solid solution. $C_3A$ with or without alkali metal oxides or traces of other oxides in solid solution may be present.

Preferably calcium sulphate in the form of natural or synthetic gypsums or soluble anhydrites is incorporated in the cement in order to obtain optimum strength development. Such an addition slightly retards the set but further small additions of retarders and/or accelerators effective to provide a desired setting time sufficient for the purpose for which the cement is intended are possible. These additional retarders are preferably conventional organic retarders for Portland cements such as citric acid, lignosulfonates and boric acid or special retarders such as sodium bicarbonate and disodium hydrogen orthophosphate. In some instances the addition during grinding of a small quantity of water may also be used to provide a retarding action. The preferred accelerators can be incorporated either as additions made to the raw feed, such as alkalies which are retained as alkali metal sulphate within the clinker during burning; or as additions either made at the grinding stage or blended into the final cement, such as potassium sulphate, conventional accelerators for Portland cement or grinding aids such as a mixture of triethanolamine and acetic acid.

The $NC_{14}A_5$ or related compound may be incorporated into the cement in several ways. In one method the essentially pure compound may be separately prepared and interground with a Portland cement clinker or thoroughly blended in a finely divided form with a Portland cement. A second method involves the preparation of a clinker rich in $NC_{14}A_5$ (or related compound) and sparse in $C_3S$ which is then interground with a Portland cement clinker or thoroughly blended in a finely divided form with Portland cement in order to provide a final product having a desired concentration of $NC_{14}A_5$ or related compound. This method is useful where the risk is present of excess alkali inhibiting the formation of $C_3S$ in the clinker. A third method involves the preparation of the final cement directly by burning selected raw materials in the presence of an appropriate amount of an alkali metal compound such as sodium carbonate, the initial $Al_2O_3$ content of the raw materials being sufficient to permit formation of the desired amount of a $NC_{14}A_5$ or related phase during burning.

In each of these suggested methods, the $NC_{14}A_5$ or related compound is formed by sintering or melting a mixture of a source of alumina, usually a kaolinitic clay such as china clay, ball clay or fire clay, a source of lime such as chalk or limestone, and a source of alkali such as sodium carbonate; the proportion of alkali being such as to allow where necessary for losses due to volatilisation during firing. The presence of small amounts of impurities or additions in the raw materials may be advantageous when such impurities or deliberate additions aid in the combination of the raw materials or by entering into solid solution in the $C_2S$ phase stabilise this phase, enhancing its strength by preventing its inversion to the $\gamma$-form. In the case of the preparation of the $K_2O$-modified $C_3A$, it has been found that the presence of a silicate phase and the incorporation of a small amount of iron oxide in the raw mix enhances the formation of this compound. It is believed that this may arise because some of the silica and iron oxide present, is also in solid solution in the potassium-modified $C_3A$. It has also been shown that for certain applications of the cement of the present invention, where long term stability is not required, the presence of significant amounts of MgO can be tolerated, permitting the use in the raw feed preparation of a dolomitic limestone, otherwise precluded from normal Portland cement manufacture. Where the raw materials are prenodulised before firing it may be necessary to provide a source of alkali which is essentially insoluble in water. This prevents the formation of a heterogeneous distribution of alkali in the nodules during drying due to soluble matter tending to concentrate in the outer layers of the nodules. In conventional cement making processes in which materials are not prenodulised before being fed to the kiln, this additional step may not be necessary.

On firing the mixture discussed above at a temperature typically in the range 1350° – 1450°C to provide satisfactory degree of combination and on cooling at a rate sufficient to permit crystallisation, a clinker is obtained in which the presence of $NC_{14}A_5$ or related compound may be confirmed by X-ray diffraction; the remaining phases being tricalcium silicate $C_3S$ and dicalcium silicate $C_2S$ with a calcium alumino ferrite, magnesia, alkali sulphates and the double sulphate $2CaS)_4 \cdot K_2SO_4$ and possibly either cubic $C_3A$ or $C_{12}A_7$ with or without alkali metal oxides in solid solution present in minor quantities. In general the clinker is burned to a free lime content in the range of 1–3 per cent, but provided the requisite phases are formed, harder burning to lower free lime contents can be tolerated without loss in the physical properties. By intergrinding the clinker with Portland cement, the $C_3S$ and alkali modified $C_3A$ content can be adjusted in the final product to provide the desired strength properties. In general the higher the $NC_{14}A_5$ content and the lower the $C_3S$ content, the higher the early strength but the lower the ultimate strength.

The quantity of calcium sulphate, expressed as $SO_3$, added to the cement in order to achieve optimum strength development lies typically between 0–15 per cent and preferably between 2–8 per cent. It has, however, been found that for compositions containing more or less $Na_2O$ than that required to form $NC_{14}A_5$, the preferred range of $SO_3$ is often narrower. By increasing the $CaSO_4$ content in the cement either as natural or synthetic gypsum, soluble anhydrite, hemihydrate or a mixture thereof, the setting time can be extended.

The final product is normally ground to a surface area as specified by the air permeability test according to BSS.12 (1971), in the range 225–600 $m^2/kg$, higher surface areas tending to shorten the initial set time and increase the early strength development. Further control of the setting times is possible by the incorporation in the final product of either an organic retarder, typically citric acid, or other organic hydroxy acids or inorganic retarders such as boric acid, sodium bicarbonate or di-sodium hydrogen orthophosphate. These may be ground with the clinker or in some instances either blended in the final cement before supply to a user, or supplied separately so that the user may add it during mixing in order to suit the setting time and hardening rate to his own requirements.

The cements of this invention may be used in a conventional way, employing good quality aggregates, in applications where a short initial setting time and high ultimate strength are desired. The cement also finds utility as a binder in fibre reinforced composites, as a binder for light-weight aggregates and as a bonding agent in the agglomeration of ores and foundry sands. The cements according to the present invention find special utility in binding material from coal measures even when contaminated with or consisting of coal, the organic constituents of which can have a considerable but unpredictable effect upon the behaviour of some other known rapidly hardening cements.

The preparation and use of cements in accordance with this invention is illustrated in the following Examples in which all percentages and proportions are by weight.

EXAMPLE 1

A clinker rich in alkali modified $C_3A$ was prepared as follows.

In order to avoid a heterogeneous distribution of soluble sodium carbonate during drying of pre-fabricated pellets of raw material, a source of largely insoluble $Na_2O$ was prepared by blending a china clay whose principal constituents were $SiO_2$ 48.2 per cent, $Al_2O_3$ 36.0 per cent, $Fe_2O_3$ 1.1 per cent and CaO 0.1 per cent, a finely divided silica (89.1 per cent $SiO_2$) and a sodium carbonate in the approximate proportions (dry basis) 55 per cent clay, 22 per cent silica, and 23 per cent sodium carbonate. The mix was sintered in an oil-fired furnace at 1000°C. for approximately 5 minutes to yield a product of the analysis:

| | |
|---|---|
| $SiO_2$ | 56.0 per cent |
| $Al_2O_3$ | 21.0 per cent |
| $Fe_2O_3$ | 0.6 per cent |
| CaO | 0.2 per cent |
| $Na_2O$ (water soluble) | 5.5 per cent |
| $Na_2O$ (water insoluble) | 10.7 per cent |

This alkali-frit product was ground in a ball mill to a residue of 10 per cent on a B.S. 90 μm sieve and the $Na_2O$ source thus produced was blended to form a raw feed with the above china clay, and a whiting with the analysis:

| | |
|---|---|
| $SiO_2$ | 1.2 per cent |
| $Al_2O_3$ | 0.2 per cent |
| $Fe_2O_3$ | 0.1 per cent |
| CaO | 54.7 per cent |
| MgO | 0.3 per cent |
| L.O.I | 0.4 per cent |
| $CO_2$ | 42.6 per cent |
| $SO_3$ | 0.09 per cent |
| $K_2O$ | 0.04 per cent |
| $Na_2O$ | 0.06 per cent |
| $Mn_2O_3$ | 0.04 per cent |
| $P_2O_5$ | 0.06 per cent |
| $TiO_2$ | 0.01 per cent |

in the approximate proportions (dry basis) 75.7 per cent whiting, 17.1 per cent china clay, 7.2 per cent $Na_2O$ source, these proportions being such as to allow for approximately 15 per cent loss of $Na_2O$ during firing. The raw feed was sintered in an oil fired furnace at about 1420°C to produce a free lime content as determined by the hot ethylene glycol extraction method of 1.3 per cent. The final clinker analysis was as follows:

| | |
|---|---|
| $SiO_2$ | 20.5 per cent |
| $Al_2O_3$ | 12.0 per cent |
| $Fe_2O_3$ | 0.5 per cent |
| CaO | 63.7 per cent |
| MgO | 0.5 per cent |
| $SO_3$ | 0.03 per cent |
| $K_2O$ | 0.2 per cent |
| $Na_2O$ | 1.5 per cent |

The lime saturation factor as defined in BSS 12 (1971) of this clinker was 0.883, the silica ratio (S/A+F) 1.64 and the alumina ratio (A/F) 24.0. The potential phase analysis of this clinker as calculated from its oxide analysis, and assuming all the $Na_2O$ reacted with the calcium aluminate phase to form an $NC_{14}A_5$ — $Na_2O$ solid solution is:

| | |
|---|---|
| $C_3S$ | 21.4 per cent |
| $C_2S$ | 38.1 per cent |
| $NC_{14}A_5$ (with $Na_2O$ in solid solution) | 31.2 per cent |
| $C_4AF$ | 1.5 per cent |

together with other minor phases. The presence of the above principal phases was confirmed by X-ray diffraction techniques. A cement was prepared by grinding this clinker with gypsum and citric acid to a surface area of 468m²/kg measured by the air permeability method according to B.S.S. 12 (1971). The quantity of gypsum added was such as to give a total $SO_3$ content attributable both to the added gypsum and to that present in the clinker of 2.5 per cent as determined by analysis, whilst the amount of citric acid added was 1.5 per cent.

EXAMPLE 2

The cement of Example 1 was tested for setting time according to B.S.S. 12 (1971) and gave a time to initial set (per cent consistency water 30.3 per cent) of 14 minutes and a time to final set (per cent consistency water 30.3 per cent) of 20 minutes.

The pumpability time of a paste having a water/cement ratio of 0.5 was 10 minutes.

A concrete for compressive strength tests was made up from 1 part cement, 2.5 parts Mount Sorrel granite, 3.5 parts of Curtis sand and 0.6 parts water. The test results were as follows for the compressive strengths of 100 mm concrete cubes:

| | |
|---|---|
| After 1 hour | 50 p.s.i |
| 2 hours | 765 p.s.i |
| 4 hours | 860 p.s.i |
| 8 hours | 910 p.s.i |
| 24 hours | 1090 p.s.i |
| 3 days | 1535 p.s.i |
| 7 days | 1745 p.s.i |
| After 28 days | 2420 p.s.i |
| 3 months | 3305 p.s.i |

EXAMPLE 3

The cement of Example 1 was used as a binder for a coal shale, the overall composition of the mix being 1 part cement, 6 parts dry shale and 2 parts water. The setting time of the slurry produced was approximately 10 minutes and the compressive strengths of 100 mm cubes of the mix were:

| | |
|---|---|
| After 2 hours | 110 p.s.i |
| 4 hours | 110 p.s.i |
| 24 hours | 110 p.s.i |
| 3 days | 155 p.s.i |
| 7 days | 245 p.s.i |
| 28 days | 265 p.s.i |

EXAMPLE 4

The cement described in Example 1 was prepared without a citric acid addition and tested as in the previous Example except that the coal shale and cement were initially mixed dry before water was added and the final mix placed. The approximate setting time was 20 minutes and the compressive strengths of the cubes were:

| | |
|---|---|
| After ½ hour | 17 p.s.i |
| 1 hours | 50 p.s.i |
| 2 hours | 110 p.s.i |
| 4 hours | 110 p.s.i |
| 24 hours | 110 p.s.i |

EXAMPLE 5

The cement of Example 1 was modified by replacing half the gypsum added at the grinding stage by potassium sulphate, the total $SO_3$ content of the cement being raised to 2.5 per cent as before. 2.5 per cent citric acid was added to the cement. A paste prepared from the cement with a water/cement ratio of 0.5 had a pumpability time of 10 minutes; when the cement was used as in Example 3 as a binder for coal shale, the approximate setting time was 45 minutes and the compressive strengths were:

| | |
|---|---|
| After 2 hours | 130 p.s.i |
| 4 hours | 140 p.s.i |
| 24 hours | 150 p.s.i |

EXAMPLE 6

The cement of Example 1 was modified by adding a mixture of 0.15 per cent of the final cement of triethanolamine and 0.07 per cent of the final cement of acetic acid as a grinding aid to the clinker and gypsum before grinding. 2.5 per cent citric acid was added to the cement which was tested as in the previous Example.

The paste with a water/cement ratio of 0.5 had a pumpability time of 10 minutes. The approximate setting time was 45 minutes and the compressive strengths were:

| | |
|---|---|
| After 2 hours | 135 p.s.i |
| 4 hours | 150 p.s.i |
| 24 hours | 180 p.s.i |

EXAMPLE 7

The cement of Example 1 was admixed with sand and molasses to make up a conventional foundry sand in which the quantity of cement was 7.8 per cent. The compressive strengths of 2 inch × 2 inch air cured cylinders formed from this mix were:

| | |
|---|---|
| After 3 hours | 110 p.s.i |
| 6 hours | 172 p.s.i |
| 24 hours | 320 p.s.i |

EXAMPLE 8

The cement of Example 1 was used as a binder for ground iron ore by producing a mix of 8 parts iron ore, 1 part cement and 1 part water. The compressive strengths of 1 inch × 1 inch air cured cubes formed from this mix were:

| | |
|---|---|
| After 2 hours | 94 p.s.i |
| 4 hours | 171 p.s.i |
| 6 hours | 337 p.s.i |

EXAMPLE 9

A raw material mix was prepared as in Example 1, the materials being blended in the approximate proportions (dry basis) 73.7 per cent whiting, 16.4 per cent china clay, 2.1 per cent aluminum oxide and 7.8 per cent $Na_2O$ source, and was sintered in an oil fired furnace at about 1420°C. to produce a free lime content of 1.0 per cent as determined by the hot ethylene glycol extraction method. The final clinker analysis was as follows:

| | |
|---|---|
| $SiO_2$ | 19.9 per cent |
| $Al_2O_3$ | 14.2 per cent |
| $Fe_2O_3$ | 0.65 per cent |
| CaO | 58.8 per cent |
| MgO | 0.5 per cent |
| $SO_3$ | 0.12 per cent |
| $K_2O$ | 0.1 per cent |
| $Na_2O$ | 1.6 per cent |

It had a lime saturation factor of 0.802, a silica ratio of 1.34 and an alumina ratio of 21.8. The potential phase analysis, calculated as in Example 1 was:

| | |
|---|---|
| $C_2S$ | 57.1 per cent |
| $NC_{14}A_5$ with $NA_3O$ in solid solution | 35.0 per cent |
| $C_3A$ | 1.7 per cent |
| $C_4AF$ | 2.0 per cent |

together with other minor phases, the presence of the principal phases being confirmed by X-ray diffraction techniques.

A cement was prepared by grinding this clinker with gypsum and citric acid to a surface area of 492 $m^2/kg$ measured by the method previously described. The quantity of gypsum added was such as to give 2.5 per cent $SO_3$ in the final cement and the citric acid added was 2 per cent.

The pumpability time of a paste with a water cement ratio of 0.5 per cent was 10 minutes.

The cement when used as a binder for coal shale in Example 3 gave a slurry setting time of approximately 45 minutes and compressive strengths of 100 mm cubes of:

| | |
|---|---|
| After 2 hours | 140 p.s.i |
| 4 hours | 145 p.s.i |
| 24 hours | 145 p.s.i |

EXAMPLE 10

A raw material mix was prepared as in the previous Examples, the material being blended in the approximate proportions (dry basis) 74.2 per cent whiting, 7.5 per cent china clay, 7.7 per cent aluminium oxide and 10.6 per cent $Na_2O$ source, and was sintered in an oil fired furnace at about 1380°C. to give a free lime content of 1.5 per cent, as determined by the method previously specified. The final clinker analysis was as follows:

| | |
|---|---|
| $SiO_2$ | 17.3 per cent |
| $Al_2O_3$ | 18.7 per cent |
| $Fe_2O_3$ | 0.5 per cent |
| CaO | 58.9 per cent |
| MgO | 0.5 per cent |
| $SO_3$ | 0.1 per cent |
| $K_2O$ | 0.3 per cent |
| $Na_2O$ | 2.3 per cent |

It had a lime saturation factor of 0.827, a silica ratio of 0.90 and an alumina ratio of 37.4. The potential phase analysis, as calculated in the previous examples was:

| | |
|---|---|
| $C_2S$ | 49.0 per cent |
| $NC_{14}A_5$ (with $Na_2O$ in solid solution) | 48.0 per cent |
| $C_4AF$ | 1.5 per cent |

together with minor phases, the presence of the principal phases being confirmed by X-ray diffraction techniques. A cement was prepared by grinding this clinker with gypsum and citric acid to a surface area of 470m²/kg as measured by the method previously specified. The quantity of gypsum added was such as to give 2.5 per cent $SO_3$ in the final cement and the citric acid added was 3.0 per cent.

The pumpability time of a paste with a water cement ratio of 0.5 was 12 minutes.

The cement was used as a binder for coal shale as in the previous Example and gave a slurry setting time of approximately 45 minutes and compressive strengths of 100 mm cubes of:

| | |
|---|---|
| After 2 hours | 150 p.s.i |
| 4 hours | 150 p.s.i |
| 24 hours | 160 p.s.i |

EXAMPLE 11

A raw material mix was prepared as in the previous Example, the material being blended in the approximate proportions (dry basis) 74.4 per cent whiting, 13.0 per cent $Na_2O$ source, 12.6 per cent aluminium oxide, and was sintered in an oil fired furnace at about 1380°C to yield a free lime content of 1.4 per cent as determined by the method previously specified. The final clinker analysis was as follows:

| | |
|---|---|
| $SiO_2$ | 14.9 per cent |
| $Al_2O_3$ | 22.9 per cent |
| $Fe_2O_3$ | 0.4 per cent |
| CaO | 58.3 per cent |
| MgO | 0.5 per cent |
| $SO_3$ | 0.1 per cent |
| $K_2O$ | 0.3 per cent |
| $Na_2O$ | 3.0 per cent |

It had a lime saturation factor of 0.839, a silica ratio of 0.64 and an alumina ratio of 57.2. The potential phase analysis as calculated in the previous Examples was

| | |
|---|---|
| $C_2S$ | 40.0 per cent |
| $NC_{14}A_5$ | 57.0 per cent |
| $C_4AF$ | 1.2 per cent |

together with minor phases, the presence of the principal phases being confirmed by X-ray diffraction techniques.

A cement was prepared by grinding this clinker with gypsum and citric acid to a surface area of 450 m²/kg as measured by the method previously specified. The quantity of gypsum added was such as to give 2.5 per cent $SO_3$ in the final cement and the citric acid added was 3.5 per cent.

The pumpability time of a paste with a water cement ratio of 0.5 per cent was 10 minutes.

The cement when used as a binder for coal shale as in Example 3 gave a slurry setting time of approximately 35 minutes and compressive strengths of 100 mm cubes of:

| | |
|---|---|
| After 2 hours | 150 p.s.i |
| 4 hours | 160 p.s.i |
| 24 hours | 160 p.s.i |

EXAMPLE 12

A cement was prepared by intergrinding 80 per cent of the clinker prepared as in Example 9, with 20 per cent of a Portland cement clinker, gypsum and citric acid to a surface area of 450 m²/kg as measured by the method previously described. The P. C. clinker employed had an analysis as follows:

| | | | | | |
|---|---|---|---|---|---|
| $SiO_2$ | 20.2 | $P_2O_5$ | 0.16 | $SO_3$ | 1.0 |
| $Al_2O_3$ | 5.1 | TiO | 0.11 | $K_2O$ | 0.93 |
| $Fe_2O_3$ | 4.6 | CaO | 65.0 | $Na_2O$ | 0.37 |
| $Mn_2O_3$ | 0.1 | MgO | 0.9 | | |

It had a lime saturation factor of 0.99, a silica ratio of 2.08, an alumina ratio of 1.11 and a free lime content of 1.8 per cent. Its potential phase analysis as calculated from the oxide analysis was:

| | |
|---|---|
| $C_4AF$ | 14.0 per cent |
| $C_3A$ | 5.8 per cent |
| $C_2S$ | 5.0 per cent |
| $C_3S$ | 70.1 per cent |

The resultant potential phase composition of the final cement, taking into account only the clinkers was thus:

| | |
|---|---|
| $C_3S$ | 14.0 per cent |
| $C_2S$ | 46.7 per cent |
| $C_3A$ | 2.5 per cent |
| $NC_{14}A_5$ (with $Na_2O$ in solid solution | 28.0 per cent |
| $C_4AF$ | 4.4 per cent |
| Free lime | 1.2 per cent |

The quantity of gypsum added was such as to give a total $SO_3$ in the cement of 2.5 per cent and the quantity of citric acid added was 1.0 per cent.

The pumpability time of a paste with a water/cement ratio of 0.5 was 9 minutes. The cement when used as a binder of coal shale as in the previous Examples gave a slurry setting time of approximately 15 minutes and compressive strengths of 100 mm cubes of:

| | |
|---|---|
| After 2 hours | 75 p.s.i |
| 4 hours | 85 p.s.i |
| 24 hours | 125 p.s.i |

EXAMPLE 13

A cement was prepared by intergrinding 30 per cent of the clinker as prepared in Example 11 with 70 per cent of the Portland cement clinker used in the previous Example, gypsum and citric acid to a surface area of 450 m²/kg as measured by the method previously specified. The resultant potential phase composition of the final cement, taking into account only the clinkers was thus:

| | |
|---|---|
| $C_3S$ | 49.1 per cent |

-continued

| | |
|---|---|
| $C_2S$ | 15.5 per cent |
| $C_3A$ | 4.1 per cent |
| $NC_{14}A_5$ (with $Na_2O$ in solid solution) | 17.0 per cent |
| $C_4AF$ | 10.2 per cent |
| Free Lime | 1.7 per cent |

The quantity of gypsum added was such as to give a total $SO_3$ in the cement of 2.8 per cent and the quantity of citric acid added was 1.0 per cent.

The pumpability time of a paste with a water cement ratio of 0.5 was 9 minutes. The cement when used as a binder of coal shale as in the previous Example gave a slurry setting time of approximately 20 minutes and compressive strengths of 100 mm cubes of:

| | |
|---|---|
| After 2 hours | 40 p.s.i |
| 4 hours | 80 p.s.i |
| 24 hours | 120 p.s.i |

EXAMPLE 14

The cement described in the previous Example was tested as in Example 2 for setting times according to BSS 12 (1971) and gave a time of initial set (per cent consistency water 35 per cent) of 30 minutes and a time to final set (per cent consistency water 35 per cent) of 40 minutes. The compressive strengths of concrete cubes prepared as in Example 2 were:

| | |
|---|---|
| After 1 hour | 40 p.s.i |
| 2 hours | 160 p.s.i |
| 4 hours | 210 p.s.i |
| 24 hours | 1207 p.s.i |

EXAMPLE 15

The composition of the clinker described in Example 1 was modified by preparing a raw material mix by blending in the approximate proportions (dry basis) 70.5 per cent whiting, 17.8 per cent china clay, 6.8 per cent $Na_2O$ source and 5.6 per cent magnesium oxide. This was sintered in an oil fired furnace at about 1380°C. to produce a free lime content of 0.7 per cent as determined by the method previously described. The final clinker analysis was as follows:

| | |
|---|---|
| $SiO_2$ | 19.6 per cent |
| $Al_2O_3$ | 11.0 per cent |
| $Fe_2O_3$ | 0.5 per cent |
| CaO | 54.7 per cent |
| MgO | 8.85 per cent |
| $SO_3$ | 0.20 per cent |
| $K_2O$ | 0.40 per cent |
| $Na_2O$ | 1.30 per cent |

It had a lime saturation factor of 0.80, a silica ratio of 1.70 and an alumina ratio of 22.0. The potential phase analysis as calculated in Example 1 was:

| | |
|---|---|
| $C_3S$ | Nil |
| $C_2S$ | 56.2 per cent |
| $NC_{14}A_5$ | 28.4 per cent |
| $C_4AF$ | 1.5 per cent |
| Free Lime | 0.7 per cent |

together with other minor phases, the presence of the principal phases being confirmed by X-ray diffraction techniques.

A cement was prepared by grinding this clinker with gypsum and citric acid to a surface area of 450 $m^2/kg$ as measured by the method previously described. The quantity of gypsum added was such as to give 2.5 per cent $SO_3$ in the final cement and the citric acid addition was 1.0 per cent.

The pumpability time of a paste with a water cement ratio of 0.5 was 10 minutes.

The cement when used as a binder for coal shale as in Example 3 gave a slurry setting time of approximately 10 minutes and compressive strengths of 100 mm cubes of:

| | |
|---|---|
| After 2 hours | 105 p.s.i |
| 4 hours | 105 p.s.i |
| 24 hours | 110 p.s.i |

EXAMPLE 16

A clinker rich in alkali modified $C_3A$ in which the $C_3A$ phase was modified by both $Na_2O$ and $K_2O$ entering into solid solution was prepared as follows:

A potash feldspar of the analysis:

| | |
|---|---|
| $SiO_2$ | 65.9 per cent |
| $Al_2O_3$ | 18.5 per cent |
| $Fe_2O_3$ | 0.1 per cent |
| CaO | 0.5 per cent |
| MgO | 0.1 per cent |
| $SO_3$ | 0.1 per cent |
| $K_2O$ | 11.6 per cent |
| $Na_2O$ | 2.9 per cent |

was ground in a ball mill to a residue of 10 per cent on a B.S. $\mu m$ sieve and was blended with the whiting and china clay used in Example 1 and an iron oxide and aluminium oxide in the approximate proportions (dry basis) 74.0 per cent whiting, 14.8 per cent potash feldspar, 6.4 per cent china clay, 1.5 per cent iron oxide and 3.3 per cent aluminium oxide. These proportions being such as to allow for a loss of $K_2O$ during firing.

The raw feed was sintered in an oil fired furnace at about 1420°C. to produce a free lime content of 1.4 per cent as determined by the method previously specified.

The final clinker analysis was as follows:

| | |
|---|---|
| $SiO_2$ | 21.6 per cent |
| $Al_2O_3$ | 11.7 per cent |
| $Fe_2O_3$ | 2.3 per cent |
| CaO | 58.3 per cent |
| MgO | 0.5 per cent |
| $SO_3$ | 0.1 per cent |
| $K_2O$ | 2.3 per cent |
| $Na_2O$ | 0.7 per cent |

The lime saturation factor of this clinker was 0.767, the silica ratio 1.54, and the alumina ratio 5.09. The potential phase analysis of this clinker as calculated from its oxide analysis and assuming all the $Na_2O$ had entered into solid solution in the calcium aluminate phase and that sufficient $K_2O$ was also in solution to modify all of the $C_3A$ was as follows:

| | |
|---|---|
| $C_2S$ | 61.9 per cent |
| $NC_{14}A_5$-$KC_{14}A_5$-alkali solid solution | 27.5 per cent* |
| $C_4AF$ | 7.0 per cent |

*'K' represents $K_2O$.

together with other minor phases. The presence of the above principal phases was confirmed by X-ray diffraction techniques. No cubic $C_3A$ was detected.

A cement was prepared by grinding this clinker with gypsum and citric acid to a surface area of 470 $m^2/kg$ as measured by the previously specified method. The quantity of gypsum added was such as to give 2.5 per cent $SO_3$ in the cement, whilst the amount of citric acid added was 1.0 per cent.

The pumpability of a paste having a water/cement ratio of 0.5 was 10 minutes.

When used as a binder for a coal shale as in Example 3, the setting time of the slurry produced was approximately 20 minutes. The compressive strengths of 100 mm cubes of the mix were:

| | |
|---|---|
| After 2 hours | 90 p.s.i |
| 4 hours | 100 p.s.i |
| 24 hours | 110 p.s.i |

We claim:

1. An early strength hydraulic cement comprising from 15 to 90 percent by weight, based on the cement, of an alkali metal calcium aluminate phase formed in the calcium oxide-alumina-alkali metal oxide systems by the presence of at least one alkali metal oxide in a total amount of alkali metal oxide in excess of the solid solution limit thereof in cubic tricalcium aluminate, at least part of said at least one alkali metal oxide being sodium oxide and the balance of the cement being predominantly calcium silicates.

2. A cement according to claim 1 wherein said alkali metal calcium aluminate phase is a sodium calcium aluminate phase containing 2 – 10 percent by weight of sodium oxide based on the phase.

3. A cement according to claim 1 comprising 20 – 80 percent by weight of said alkali metal calcium aluminate phase.

4. A cement according to claim 1 comprising 30 – 50 percent by weight of said alkali metal calcium aluminate phase.

5. A cement according to claim 1 in which magnesia is present.

6. A method of preparing an early strength hydraulic cement comprising from 15 to 90 percent by weight, based on the cement, of an alkali metal calcium aluminate phase formed in the calcium oxide-alumina-alkali metal oxide systems by the presence of at least one alkali metal oxide in a total amount of alkali metal oxide in excess of the solid solution limit thereof in cubic tricalcium aluminate, at least part of said at least one alkali metal oxide being sodium oxide and the balance of the cement being predominantly calcium silicates, which method comprises grinding a clinker formed by burning high alumina Portland cement ingredients in the presence of alkali to form in the resultant product the requisite amount of said alkali metal calcium aluminate phase.

7. A method of preparing an early strength hydraulic cement comprising from 15 to 90 percent by weight, based on the cement, of an alkali metal calcium aluminate phase formed in the calcium oxide-alumina-alkali metal oxide systems by the presence of at least one alkali metal oxide in a total amount of alkali metal oxide in excess of the solid solution limit thereof in cubic tricalcium aluminate, at least part of said at least one alkali metal oxide being sodium oxide and the balance of the cement being predominantly calcium silicates, which method comprises grinding a clinker containing said alkali metal calcium aluminate phase with a Portland cement clinker.

8. A method of preparing an early strength hydraulic cement comprising from 15 to 90 percent by weight, based on the cement, of an alkali metal calcium aluminate phase formed in the calcium oxide-alumina-alkali metal oxide systems by the presence of at least one alkali metal oxide in a total amount of alkali metal oxide in excess of the solid solution limit thereof in cubic tricalcium aluminate, at least part of said at least one alkali metal oxide being sodium oxide and the balance of the cement being predominantly calcium silicates, which method comprises blending a cement containing said alkali metal calcium aluminate phase with another cement.

* * * * *